Nov. 1, 1955 R. S. NEISWANDER 2,722,059
DOUBLE LAYER HOOD AND SIMULATED LIGHTING AND VARIABLE OUTSIDE
LIGHT INTENSITY EFFECTS FOR GROUNDED AVIATION TRAINER
Filed Aug. 14, 1950 3 Sheets-Sheet 1

ROBERT S. NEISWANDER
INVENTOR

BY Donald T. Hillier
ATTORNEY

Nov. 1, 1955   R. S. NEISWANDER   2,722,059
DOUBLE LAYER HOOD AND SIMULATED LIGHTING AND VARIABLE OUTSIDE
LIGHT INTENSITY EFFECTS FOR GROUNDED AVIATION TRAINER
Filed Aug. 14, 1950   3 Sheets-Sheet 2

ROBERT S. NEISWANDER
INVENTOR

BY *Donald T. Hellier*
ATTORNEY

Nov. 1, 1955                R. S. NEISWANDER                    2,722,059
        DOUBLE LAYER HOOD AND SIMULATED LIGHTING AND VARIABLE OUTSIDE
              LIGHT INTENSITY EFFECTS FOR GROUNDED AVIATION TRAINER
Filed Aug. 14, 1950                                        3 Sheets-Sheet 3
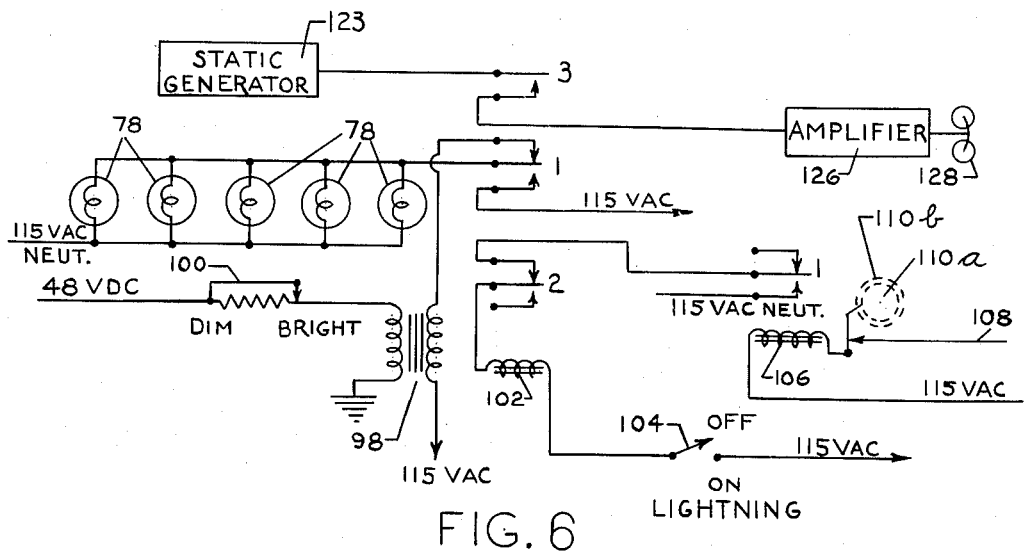
FIG. 6
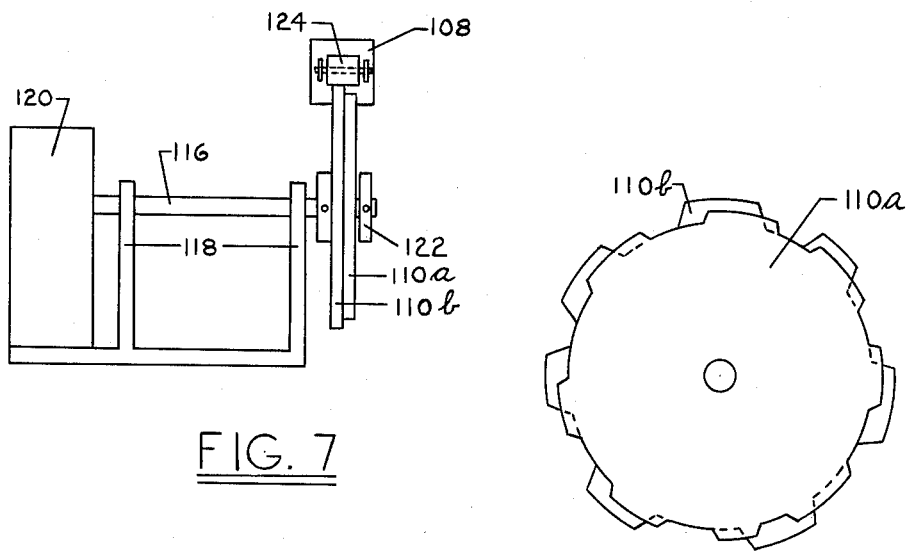
FIG. 7
FIG. 8
ROBERT S. NEISWANDER
          INVENTOR
BY *Donald T. Heller*
        ATTORNEY

United States Patent Office 2,722,059
Patented Nov. 1, 1955

2,722,059

DOUBLE LAYER HOOD AND SIMULATED LIGHT-NING AND VARIABLE OUTSIDE LIGHT INTENSITY EFFECTS FOR GROUNDED AVIATION TRAINER

Robert S. Neiswander, Lancaster, N. Y., assignor to Link Aviation, Inc., Binghamton, N. Y., a corporation of New York Application August 14, 1950, Serial No. 179,164

16 Claims. (Cl. 35—12)

This invention relates to a double canopy hood and means associated therewith for simulating lightning and variable outside light intensty effects in grounded aviaton trainers.

The invention is applicable to grounded aviation trainers comprising a cockpit having a seat for a pilot, an instrument panel carrying instruments simulating the instruments carried by a plane in actual flight, and controls such as a throttle lever, rudder pedals and a control stick, the instruments being responsive to the operation of the controls in the same manner that the corresponding instruments in a plane are responsive to the operation of the controls therein.

An important feature of the invention is a hood comprising an opaque outer canopy and a translucent inner canopy, the two canopies being separated from one another to provide space therebetween with illumination means in the said space for lighting the inner surface of the outer canopy. Inasmuch as the inner canopy is translucent, the pilot in the trainer is given a sensation of an outside light intensity varying with the illumination on the said surface. By varying the intensity of the illumination, actual flying conditions are simulated wherein the illumination outside an aircraft varies from bright sunlight to total darkness. By intermittently suddenly varying the said illumination from a low to a high intensity in an irregular pattern, lightning flashes as seen from a plane in flight are simulated, and by synchronizing this illumination with a static generator connected to the pilot's earphones in the trainer, the static heard in the airborne pilot's earphones accompanying lightning flashes is simulated.

Other features of the invention will become apparent as the description proceeds.

Reference is now made to the accompanying drawings, wherein

Fig. 6 is a wiring diagram of the electrical circuits of the invention.

Fig. 7 is a drawing of the cam and microswitch assembly, and

Fig. 8 is an elevation of the cams.

Figure 1:
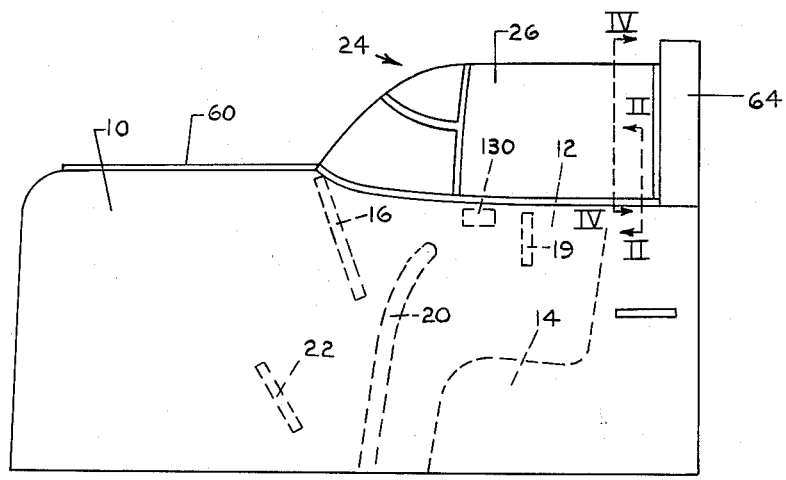
Fig. 1 is an elevation of a grounded aviation trainer showing the location of the hood.

The trainer comprises a fuselage 10 (Fig. 1) of the stationary type, although the invention is equally applicable to trainers comprising movable fuselages. Inside the fuselage is a cockpit 12 having a seat 14 for the pilot, ahead of which is an instrument panel 16 having a complement of instruments simulating the instruments carried by a real plane, which instruments are responsive to the operation of the simulated primary flight controls in the form of a throttle lever 19, stick 20 and rudder pedals 22 in the same manner that the corresponding instruments in a plane are responsive to the operation of the primary flight controls therein.

Figure 2:
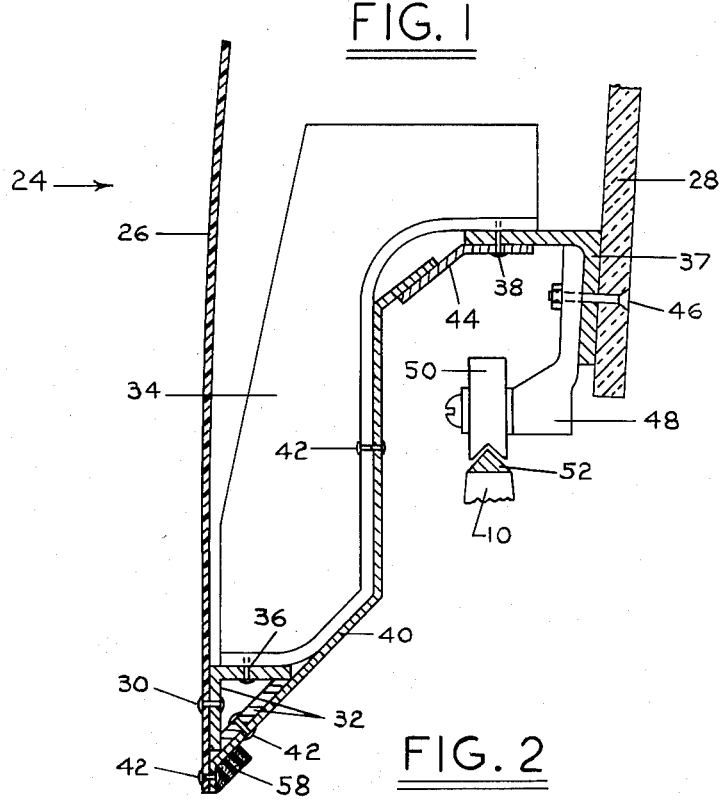
Fig. 2 is a transverse section on the line II—II of Fig. 1.
Figure 3:
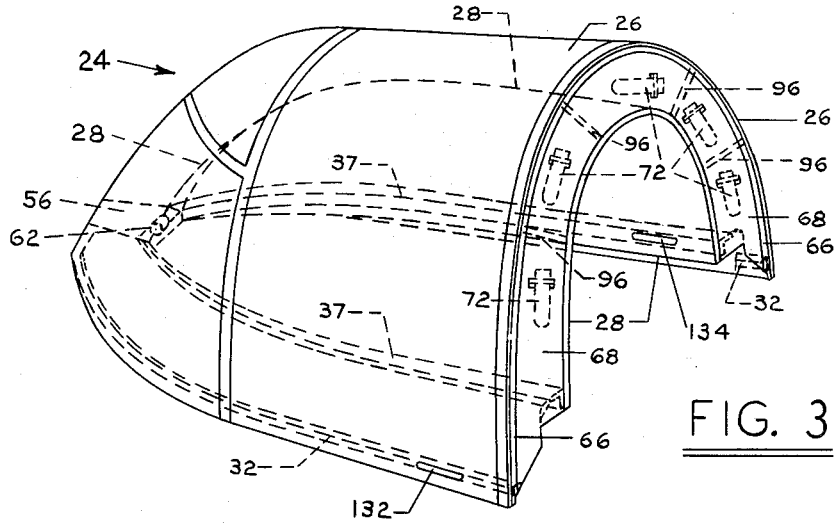
Fig. 3 is an isometric view of the hood of this invention.

The hood 24 comprises an outer opaque canopy 26 and an inner canopy 28 (Fig. 2) which is preferably translucent, as will be explained. The outer canopy 26 is affixed by rivets 30 along its lower margin to the angle piece 32 which extends around the said lower margin, and an upright bracket 34 is provided at each side of the rear of the hood. Each bracket is attached to the angle piece 32 by screws 36. The upper end of each of the brackets has an angle piece 37 attached thereto by screws 38, said angle piece extending around the lower margin of the inner canopy 28. A sealing plate 40 is attached by rivets 42 along the lower margin of the outer canopy 26 and to the angle piece 32 and brackets 34. Another sealing plate 44 is attached to the angle piece 37 and bracket 42 by the screws 38 and additional rivets (not shown). The angle piece 37 has attached thereto by bolts 46 a bracket 48 which carries a notched roller 50 which travels on a track 52 etxending along the top of the fuselage 10. The inner canopy 28 is attached to each of the brackets 48 by bolts 46. The angle piece 32 is attached to the horizontal bracket 56 (Fig. 3) which is also attached to the angle piece 37 near the forward end of the hood. Roller 62 (Fig. 3) is carried by bracket 56 for movement along track 60 (Fig. 1).

The sealing plates extend completely around the lower margins of the two canopies 26 and 28 and a removable bulkhead 68 (Fig. 4) is provided at the rear of the hood 24, the rear margins of the two canopies being attached to the bulkhead in a light-proof manner. The bulkhead and sealing plates 40 and 44 therefore provide a light-proof seal around the lower and rear margins of the two canopies.

A sponge rubber strip 58 (Fig. 2) extends completely around the lower margin of the outer canopy 26 so that when hood 24 is in its retracted position the strip engages the outer surface of fuselage 10 throughout its entire length. The strip 58 is notched complementary to track 60 at the forward end of the hood. A second sponge rubber strip 66 (Fig. 3) extends around the outer margin of the bulkhead 68 and engages the upright 64 (Fig. 1) when the hood 24 is in its retracted position. Consequently, when the hood is in its retracted position, as is the case when a problem is being "flown" in the trainer, no light from outside the cockpit enters the cockpit 12 or the space between the inner and outer canopies. A handle 132 (Fig. 3) on the outside of hood 24 and a handle 134 on the inside thereof are provided for sliding the hood fore and aft.

Figure 5:
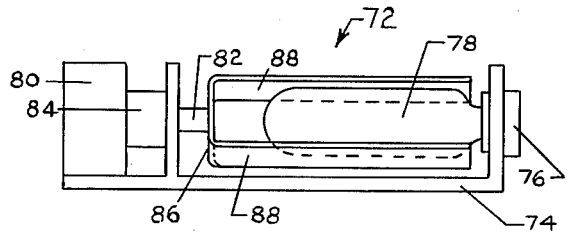
Fig. 5 is a detail view of an illuminating assembly.
Figure 4:
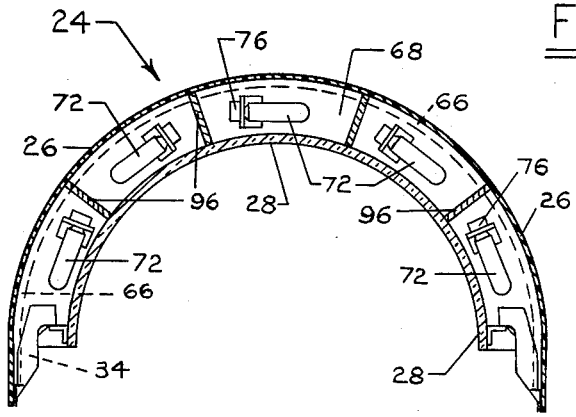
Fig. 4 is a view taken on the line IV—IV of Fig. 1.

Attached to the bulkhead 68 between the two canopies are a plurality of illuminating assemblies 72 (Fig. 4). Each of these assemblies comprises a bracket 74 (Fig. 5) affixed to the bulkhead 68, and a socket 76 into which a lamp 78 is screwed. At the other end from the socket 76 the bracket supports a motor 80 which drives at a very low speed a shaft 82 through reduction gear in box 84. Each shaft 82 has mounted upon its outer end a metal disc 86 having a pair of integral opaque fingers 88 which extend along the outside of lamp 78. When energized, each motor 80 slowly rotates its associated disc 86 and fingers 88 around the associated lamp 78.

The bulkhead 68 has attached thereto the forwardly extending baffles 96 placed between the lamp assemblies 72.

The circuit for illuminating the lamps 78 comprises a saturable reactor 98 (Fig. 6) the left coil of which is connected through the instructor's illumination intensity control 100 to a 48 v. D. C. source and the right coil of which has one end connected to 115 v. A. C. while its other end is connected through the NC contact 1 of relay 102, and the lamps 78 to the neutral 115 v. A. C. line. NO contact 1 of relay 102 is connected to 115 v. A. C.

The right end of relay 102 is connected through the instructor's lightning "on-off" switch 104 to 115 v. A. C., and the upper end of the relay is connected through its NC contact 2 to the center contact 1 of relay 106. Relay 106 is connected to the 115 v. A. C. line through micro switch 108 under the control of cams 110a and 110b. Cam 110b is affixed upon shaft 116 (Fig. 7) which is supported by brackets 118 and driven by motor 120 at a relatively slow rate, e. g., 4 R. P. M. Cam 110a is free on shaft 116 and held thereon adjacent cam 110b by stop 122. The diameters of cams 110a and 110b exclusive of the risers thereon are equal (Fig. 8), and the risers on cam 110b are somewhat higher than those on cam 110a, the risers on both cams being finely serrated. The roller 124 of micro switch 108 is in the same plane as the cams and rides on the peripheries thereof, and micro switch 108 is closed whenever the roller 124 is not moved outwardly from the center of the cams by engagement with a riser of one of the cams. When the roller drops between two risers of cam 110a and engages the end of the riser, the cam is prevented from rotating with shaft 116, and its rotational position relative to cam 110b is shifted since cam 110b is fixed on the shaft. When roller 124 is on a riser on cam 110b, cam 110a rotates with cam 110b. Consequently, the relative rotational positions of the two cams is frequently changed, thereby rendering the sequence of closing of switch 108 unpredictable. The frequency and duration of closing of switch 108 may be regulated as desired by proper design of the cams.

With the instructor's lightning switch 104 in the "on" position, 115 v. A. C. is routed through the NC contact 2 of relay 102 and NO contact 1 of relay 106 upon closing of switch 108 which energizes relay 106. Assuming relay 106 remains energized for a certain period, e. g., one-half second, the energization of relay 102 breaks its own circuit, deenergizing the relay and closing its circuit, etc., so that the contacts 1 and 2 of relay 102 chatter as long as switch 108 is closed. During this period 115 v. A. C. is intermittently supplied to the lamps 78, causing them to flash and lighting the inner surface of the outer canopy. The resulting light transmitted through the inner translucent canopy 28 to the pilot in the cockpit simulates very realistically lightning flashes as seen by the pilot of a plane. Concomitant with the simulated lightning flashes, the NO contact 3 of relay 102 is closed whenever the relay is energized, and static signals from the static generator 123 are routed through the NO contact 3 and amplifier 126 to the earphones 128, as disclosed more fully in the copending application of James Hicken, Serial Number 149,053, filed March 11, 1950 for Radio Navigation Trainer, which issued August 10, 1954 as Patent 2,685,747. The static signals received by the pilot simulate the static picked up by an airborne radio receiver during a lightning storm.

To control the intensity of the illumination in the space between the outer and inner canopies 26 and 28, the instructor may set the potentiometer 100 which regulates the D. C. voltage applied to the coil of reactor 98. The higher the D. C. voltage so applied, the more intense is the illumination of lamps 78. Consequently, flight under light conditions varying from bright sunlight to total darkness may be simulated. The same variation of illumination may also be employed to simulate "blacking out" of the pilot due to lack of oxygen or "g" effect. The cockpit of the trainer is equipped with the usual lights 130 for illuminating the cockpit when the light entering the same through the inner translucent canopy 28 is insufficient.

The fingers 88 are provided to simulate the shadows cast by clouds on the canopy of an aircraft. The slow rotation of the fingers by the motors 80 which are controlled through a conventional "on-off" switch (not shown) causes shadows cast by fingers 88 on the inner surface of the outer canopy to slowly move along the same from the front to the rear thereof, thereby producing the illusion of moving through variable density cloud banks.

The inside surface of the outer canopy is preferably perfectly smooth with no structural features, such as rivets and joints, visible to the pilot as he looks through the inner canopy at the interior surface of the outer canopy, and the said surface is preferably painted white. The brackets 34 and 56, sealing plates 40 and 44 and other structural features connecting the two canopies around their lower margins are placed so as not to be seen by the pilot in the trainer, and preferably there are no structural connections between the two canopies other than around their adjacent margins. The inner canopy is translucent, and may be constructed of clear Plexiglas fogged by black paint on its outer surface, which fogging is preferably heavy enough to render invisible to the pilot any structural features on the inside of the outer canopy. Inasmuch as the lamps 78 are at the rear of the hood, in order to achieve a uniform transmission of light through all areas of the inner canopy, the fogging is preferably heavier near the read end of the canopy, being gradually decreased to a minimum at the front end thereof. The rear end of the inner canopy may be heavily fogged, since the same is to the rear of the pilot's head. The inner canopy is preferably shaped like and constructed identically like the windshield of the plane being simulated, and consequently need not be a single piece of material, but may be several pieces attached to the usual frame members. The illumination of the inner surface of the outer canopy gives the illusion of looking through rather than at the inner canopy.

The extent to which the foregoing details of the invention are adopted depends, of course, upon the degree of realistic simulation which it is desired to achieve.

Numerous changes may be made from the disclosed preferred embodiment of the invention without departing from the substance thereof as covered by the following claims.

I claim:

1. In a grounded aviation trainer, a cockpit for a pilot, a hood over said cockpit, said hood comprising an opaque outer canopy and a translucent inner canopy separated therefrom, a source of illumination between the two canopies for lighting the inner surface of the outer canopy, means for regulating the intensity of the source of illumination, means for flashing the source of illumination to simulate lightning effects as seen from a plane in flight, aural signal receiving means in the trainer, and means for operating the aural signal receiving means simultaneously with the said flashing to simulate static accompanying lightning flashes received by the aural signal receiving means in a plane in flight.

2. In a grounded aviation trainer, a cockpit for a pilot, a hood for said cockpit, said hood comprising a curved outer canopy of opaque material and a curved inner canopy of translucent material, means holding the outer surface of said inner canopy substantially concentric with the inner surface of said outer canopy and in spaced relation therefrom, a source of illumination in one end of the space between the two said canopies for lighting the inner surface of the outer canopy, means outside said cockpit for regulating the intensity of said illumination source, and remotely controllable automatic means for flashing said source of illumination to simulate lightning effects as seen from a plane in flight.

3. In a grounded aviation trainer, a cockpit for a pilot, a hood for said cockpit, said hood comprising an opaque outer canopy and a translucent inner canopy separated therefrom, means holding said inner canopy in fixed spaced relation from the inner surface of said outer canopy, a source of illumination in the space between the two said canopies at one end thereof for lighting the inner surface of said outer canopy, means substantially uniformly distributing transmission of illumination from said source through said translucent inner canopy, an opaque member arranged for rotation about said source of illumination, and means for rotating said member to cast moving shadows on the inner surface of said outer canopy to simulate the shadows cast by clouds upon the canopy of a plane in flight.

4. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, the interior surface of said outer canopy being light colored and relatively uniform in appearance and the translucency of said inner canopy being insufficient to render distinguishable variations in the construction of the inside surface of said outer canopy as viewed from the cockpit, a source of illumination in the space between the two said canopies and at one end thereof for illuminating the inner surface of said outer canopy, the translucency of said inner canopy being graduated from a minimum at the end thereof adjacent said illumination source to a maximum at the end thereof opposite to the location of said source, and means outside said cockpit for varying the intensity of said illumination source.

5. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, means on said inner canopy effecting a gradation in the light absorption of said canopy from a maximum at one end to a minimum at the opposite end thereof, a source of illumination in the space between said canopies adjacent the end of said maximum light absorption of said canopy, and means outside said cockpit for varying the intensity of said illumination source.

6. In a grounded aviation trainer, a cockpit for a pilot, a hood for said cockpit, said hood comprising an opaque outer canopy and a translucent inner canopy substantially uniformly spaced therefrom, means holding said inner canopy substantially equidistant at all points thereof from the inner surface of said outer canopy, a source of illumination in the space between said canopies adjacent one end thereof, means on at least one of said canopies for causing substantially uniform transmission of illumination from said source through said inner canopy, and means outside said cockpit for varying the intensity of said illumination source to simulate within said cockpit the appearance of sky as seen from the cockpit of an aircraft in flight.

7. In a grounded aviation trainer, a cockpit for a pilot, a hood for said cockpit, said hood comprising an opaque outer canopy and a translucent inner canopy substantially uniformly spaced therefrom, means holding said inner canopy substantially equidistant at all points thereof from the inner surface of said outer canopy, a source of illumination in the space between said canopies adjacent one end thereof, means on at least one of said canopies for causing substantially uniform transmission of illumination from said source through said inner canopy, means outside said cockpit for varying the intensity of said illumination source to simulate within said cockpit the appearance of sky as seen from the cockpit of an aircraft in flight, an opaque member arranged for rotation about said source of illumination, and means for rotating said member to cast moving shadows on the inner surface of said outer canopy to simulate the shadows cast by clouds upon the canopy in flight.

8. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, a source of illumination in the space between said canopies adjacent one end thereof, means on at least one of said canopies for causing substantially uniform transmission of illumination from said source through said inner canopy, means outside said cockpit for varying the intensity of said illumination source to simulate within said cockpit the appearance of sky as seen from the cockpit of an aircraft in flight, an opaque member arranged for rotation about said source of illumination, means for rotating said member to cast moving shadows on the inner surface of said outer canopy to simulate the shadows cast by clouds upon the canopy of an aircraft in flight, and remotely controllable automatic means for erratically flashing said source of illumination to simulate lightning effects as viewed from the cockpit of an aircraft in flight.

9. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, a source of illumination in the space between said canopies adjacent one end thereof, means on at least one of said canopies for causing substantially uniform transmission of illumination from said source through said inner canopy, means outside said cockpit for varying the intensity of said illumination source to simulate within said cockpit the appearance of sky as seen from the cockpit of an aircraft in flight, an opaque member arranged for rotation about said source of illumination, means for rotating said member to cast moving shadows on the inner surface of said outer canopy to simulate the shadows cast by clouds upon the canopy of an aircraft in flight, remotely controllable automatic means for erratically flashing said source of illumination to simulate lightning effects as viewed from the cockpit of an aircraft in flight, aural signal receiving means in said cockpit, and means operating said aural signal receiving means substantially concurrently with said flashing means to simulate sounds accompanying lightning flashes as received in the cockpit of an aircraft in flight.

10. In a grounded aviation trainer, a cockpit for a pilot, a hood for said cockpit, said hood comprising an opaque outer canopy and a translucent inner canopy substantially uniformly spaced therefrom, means holding said inner canopy substantially equidistant at all points thereof from the inner surface of said outer canopy, a source of illumination in the space between said canopies adjacent one end thereof, means on at least one of said canopies for causing substantially uniform transmission of illumination from said source through said inner canopy, means outside said cockpit for varying the intensity of said illumination source to simulate within said cockpit the appearance of sky as seen from the cockpit of an aircraft in flight, and remotely controllable automatic means for erratically flashing said source of illumination to simulate lightning effects as viewed from the cockpit of an aircraft in flight.

11. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, a source of illumination in the space between said canopies adjacent one end thereof, means on at least one of said canopies for causing substantially uniform transmission of illumination from said source through said inner canopy, means outside said cockpit for varying the intensity of said illumination source to simulate within said cockpit the appearance of sky as seen from the cockpit of an aircraft in flight, remotely controllable automatic means for erratically flashing said source of illumination to simulate lightning effects as viewed from the cockpit of an aircraft in flight, aural signal receiving means in said cockpit, and means operating said aural signal receiving means substantially concurrently with said flashing means to simulate sounds accompanying lightning flashes as received in the cockpit of an aircraft in flight.

12. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, the interior surface of said outer canopy being light colored and relatively uniform in appearance and the translucency of said inner canopy being insufficient to render distinguishable variations in the construction of the inside surface of said outer canopy as viewed from the cockpit, a source of illumination in the space between the two said canopies and at one end thereof for illuminating the inner surface of said outer canopy, the translucency of said inner canopy being graduated from a minimum at the end thereof adjacent said illumination source to a maximum at the end thereof remote from the location of said source, means outside said cockpit for varying the intensity of said illumination source, and remotely controllable automatic means for erratically flashing said source of illumination to simulate lightning effects as viewed from the cockpit of an aircraft in flight.

13. In a grounded aviation trainer, a cockpit for a pilot, a hood for said cockpit, said hood comprising an opaque outer canopy and a translucent inner canopy, means holding said inner canopy in fixed spaced relation from said outer canopy, a source of illumination in the space between said canopies at one end thereof for illuminating the inner surface of said outer canopy, remote control means for regulating the intensity of said illumination source, and motor driven means controllable from outside said cockpit for automatically flashing said source of illumination at irregular intervals to simulate lightning effects as seen from the cockpit of an aircraft in flight.

14. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, a source of illumination in the space between said canopies adjacent one end thereof, means on at least one of said canopies for causing substantially uniform transmission of illumination from said source through said translucent inner canopy, means outside said cockpit for varying the intensity of said illumination source, and motor driven means controllable from outside said cockpit for automatically flashing said source of illumination at irregular intervals to simulate lightning effects as seen from the cockpit of an aircraft in flight.

15. In a grounded aviation trainer, a cockpit for a pilot, a hood for said cockpit, said hood comprising an opaque outer canopy and a translucent inner canopy spaced therefrom, means holding said inner canopy in fixed spaced relation from the inner surface of said outer canopy, a source of illumination in the space between said canopies adjacent one end thereof, means on at least one of said canopies for causing substantially uniform transmission of illumination from said source through said translucent inner canopy, means outside said cockpit for varying the intensity of said illumination source, motor driven means controllable from outside said cockpit for automatically flashing said source of illumination at irregular intervals to simulate lightning effects as seen from the cockpit of a plane in flight, aural signal receiving means in the trainer, and means operating said aural signal receiving means in substantial synchronism with the said flashing means to simulate static accompanying lightning flashes received by the aural signal receiving means of an aircraft in flight.

16. In a grounded aviation trainer, a cockpit for a pilot, a hood for said cockpit, said hood comprising an opaque outer canopy and a translucent inner canopy in spaced relation therefrom, a source of illumination in the space between the two canopies for illuminating the inner surface of the outer canopy, means outside the cockpit for regulating the intensity of said illumination source, motor driven means controllable from outside said cockpit for automatically flashing said source of illumination at erratic intervals to simulate lightning effects as seen from the cockpit of a plane in flight, aural signal receiving means in the trainer, and means for operating said aural signal receiving means in substantial synchronism with said flashing means to simulate static accompanying lightning flashes as received by radio receiving means in an aircraft in flight.

References Cited in the file of this patent

UNITED STATES PATENTS

| Number | Name | Date |
|---|---|---|
| 873,020 | Collins | Dec. 10, 1907 |
| 2,118,264 | Nanfeldt | May 24, 1938 |
| 2,295,345 | Jerman | Sept. 8, 1942 |
| 2,331,303 | Carmody | Oct. 12, 1943 |
| 2,367,035 | McConnell | Jan. 9, 1945 |
| 2,409,938 | Hutter | Oct. 22, 1946 |
| 2,482,115 | Laird | Sept. 20, 1949 |
| 2,485,293 | Kail | Oct. 18, 1949 |
| 2,492,969 | Crane | Jan. 3, 1950 |
| 2,502,834 | Dreyer | Apr. 4, 1950 |
| 2,510,500 | Hayes | June 6, 1950 |
| 2,510,848 | Wood | June 6, 1950 |
| 2,518,419 | Dehmel | Aug. 8, 1950 |